United States Patent
Oltheten et al.

(10) Patent No.: US 10,457,417 B2
(45) Date of Patent: Oct. 29, 2019

(54) FLIGHT INSTRUMENT WARNING DISPLAY

(71) Applicant: Bell Helicopter Textron Inc., Fort Worth, TX (US)

(72) Inventors: Erik John Oltheten, Fort Worth, TX (US); Thomas Wayne Brooks, Starkville, MS (US)

(73) Assignee: Bell Textron Inc., Fort Worth, TX (US)

( * ) Notice: Subject to any disclaimer, the term of this patent is extended or adjusted under 35 U.S.C. 154(b) by 0 days.

(21) Appl. No.: 16/171,672

(22) Filed: Oct. 26, 2018

(65) Prior Publication Data

US 2019/0127082 A1 May 2, 2019

Related U.S. Application Data

(60) Provisional application No. 62/577,623, filed on Oct. 26, 2017.

(51) Int. Cl.
*G08B 23/00* (2006.01)
*B64D 45/08* (2006.01)
*B64D 43/02* (2006.01)
*B64D 45/00* (2006.01)

(52) U.S. Cl.
CPC ............. *B64D 45/08* (2013.01); *B64D 43/02* (2013.01); *B64D 2045/0085* (2013.01)

(58) Field of Classification Search
None
See application file for complete search history.

(56) References Cited

U.S. PATENT DOCUMENTS

| | | | | |
|---|---|---|---|---|
| 7,414,544 B2* | 8/2008 | Oltheten | ................ | G01D 7/002 340/946 |
| 2006/0287778 A1* | 12/2006 | Oltheten | ................ | G01D 7/002 701/1 |
| 2009/0186320 A1* | 7/2009 | Rucci | ..................... | B64C 27/04 434/33 |
| 2016/0016652 A1* | 1/2016 | Barrett | ................... | B64C 25/06 244/15 |

FOREIGN PATENT DOCUMENTS

| | | |
|---|---|---|
| CA | 929264 A | 6/1973 |
| EP | 2939930 A1 | 11/2015 |
| EP | 3051521 A2 | 8/2016 |
| EP | 3051521 A3 | 8/2016 |
| EP | 3124385 A1 | 2/2017 |

(Continued)

OTHER PUBLICATIONS

European Patent Office, "European Search Report," EP Application No. 18202863.9, dated Mar. 8, 2019, 4 pages, publisher Munich, Germany.

(Continued)

*Primary Examiner* — Julie B Lieu
(74) *Attorney, Agent, or Firm* — Fogarty LLP

(57) ABSTRACT

Embodiments are directed to flight instrument warnings that are configured to automatically adjust a low airspeed warning band on an airspeed indicator based on available torque margin and radar altimeter height. Warnings may be presented on a primary flight display or on flight instruments when a low airspeed band is entered.

15 Claims, 6 Drawing Sheets

(56) References Cited

FOREIGN PATENT DOCUMENTS

KR     20110026625 A     3/2011
WO        8701356 A1     3/1987

OTHER PUBLICATIONS

European Patent Office, Communication Pursuant to Article 94(3) EPC, EP Application No. 18202863.9, dated Mar. 22, 2019, 5 pages.
Civil Aviation Authority, "Offshore Helicopter Terrain Awareness Warning System Alert Envelopes," CAP 1519, Jul. 2017, 19 pages.
Peter Clapp, et al., "Class A Terrain Awareness Warning System (TAWS) for Offshore Helicopter Operations," Report for UK Civil Aviation Authority, CAP1538, Apr. 2017, 92 pages.

\* cited by examiner

FLIGHT INSTRUMENT WARNING DISPLAY

CROSS-REFERENCE TO RELATED APPLICATIONS

This application claims the benefit of the filing date of U.S. Provisional Patent Application No. 62/577,623, which was filed Oct. 26, 2017, the disclosure of which is hereby incorporated by reference herein in its entirety.

TECHNICAL FIELD

The present invention relates to flight instrument warning displays for improving rotorcraft operations in close proximity to terrain, ground, and obstacles.

BACKGROUND

Controlled Flight Into Terrain (CFIT) has been identified as a major cause of helicopter accidents. This phenomenon usually occurs under degraded visual conditions, such as when flying under Visual Flight Rules (VFR) at night or during flight in Instrument Meteorological Conditions (IMC). The introduction of Ground Proximity Warning Systems (GPWS) resulted in a significant decline in the number of CFIT incidents. GPWS equipment automatically provides a warning to the flight crew when an aircraft is in potentially dangerous proximity to the ground. The Helicopter Terrain Awareness and Warning System (HTAWS) provides rotorcraft flight crews with aural and visual alerts of a pending collision of the terrain. Forward Looking Terrain Avoidance (FLTA) is a look-ahead function that provides enhanced awareness using terrain and obstacle displays. HTAWS provides warnings when the following conditions are detected, for example: excessive descent rate, excessive terrain closure rate, excessive altitude loss after take-off or go-around, unsafe terrain clearance, excessive deviation below an instrument glide path.

HTAWS's "look-ahead" mode or Enhanced Mode generally provides satisfactory alerting over land using GPS position and a terrain database. However, offshore operations, such as in support of oil and gas exploration, have shown that HTAWS is not optimized for the offshore operational environment.

SUMMARY

In an embodiment, flight instrument warnings are configured to automatically adjust a low airspeed warning band on an airspeed indicator based on available torque margin and radar altimeter height. Warnings may be presented on a primary flight display or on flight instruments when a low airspeed band is entered. The system can include a central processing unit or processor that is integrated with a primary flight display or that is a separate component. The processor receives inputs, such as mast torque, torque limit, airspeed, altitude (e.g., barometric altitude), and height above surface (e.g., radar altimeter). The system outputs aural and/or visual warnings. Aural warnings may comprise a unique voice indication (e.g., "POWER! POWER!"). These warnings can improve safety in flight operations that occur off-shore, over water where radar altimeter and barometric altimeter information may also be effective in providing surface avoidance. These warnings take into consideration factors, such as altitude, airspeed, and torque margin, that are unique to the helicopter model.

Embodiments of the display disclosed herein are an improvement over prior aircraft instrument displays. Existing aircraft displays provide information such as airspeed, altitude, rate of descent, and power situation information. However, pilots are required to read and absorb those individual elements, evaluate the overall aircraft situation based upon prior experience and training, and then determine if the aircraft is in or is approaching unsafe flight conditions. Such mental analysis can be a burden on the pilot when flying during times that require highly focused attention, such as low altitude and low speed flight in adverse meteorological conditions. The improved display disclosed herein increases flight safety by providing indications and warnings that inherently combine multiple aircraft factors, such as airspeed, altitude, and power situation, into a single display. For example, the airspeed indication in prior displays indicates current airspeed alone. The improved display disclosed herein adds an airspeed warning band that shows where the current airspeed is relative to safe or unsafe flight conditions for the current altitude and power situation. As a result, in a single glance, a pilot can determine not only the current airspeed but also its relative safety in view of other operating parameters.

In an example embodiment, an aircraft display comprises a calculation unit configured to receive inputs from one or more aircraft systems and to determine if warnings should be displayed based on current aircraft flight conditions and aircraft propulsion system parameters, and a display unit configured to receive input from the calculation unit and to generate graphics for a flight instrument display, wherein the graphics comprise one or more warnings indicating a low power condition during low altitude or low airspeed flight. The aircraft propulsion system parameters may comprise one or more of mast torque, torque limit, torque margin, and engine RPM. The current aircraft flight conditions may comprise one or more of airspeed, barometric altitude, and radar altitude. The current aircraft flight conditions may also comprise one or more of flight phases selected from take-off, climb-out, cruise, approach, landing, autorotation, and failed engine conditions.

The graphics may comprise an airspeed warning band having a plurality of segments, wherein each segment is associated with a different airspeed warning zone, and wherein each zone is defined based upon a current aircraft power available and a current aircraft height above surface. The graphics may further comprise one or more indicators on an airspeed display, wherein the indicators are positioned based upon an unsafe airspeed determined for a current aircraft power available and a current aircraft height above surface.

The graphics may comprise an altitude warning band having a plurality of segments, wherein each segment is associated with a different altitude warning zone, and wherein each zone is defined based upon a current aircraft power available and a current aircraft airspeed. The graphics may further comprise one or more indicators on an altitude display, wherein the indicators are positioned based upon an unsafe altitude determined for a current aircraft power available and a current aircraft airspeed.

The graphics may comprise a power warning band having a plurality of segments, wherein each segment is associated with a different power warning zone, and wherein each zone is defined based upon a current aircraft airspeed and a current aircraft height above surface. The graphics may further comprise one or more indicators on a power display, wherein the indicators are positioned based upon an unsafe available power level determined for a current aircraft airspeed and a current aircraft height above surface.

BRIEF DESCRIPTION OF THE DRAWINGS

Figure 1:
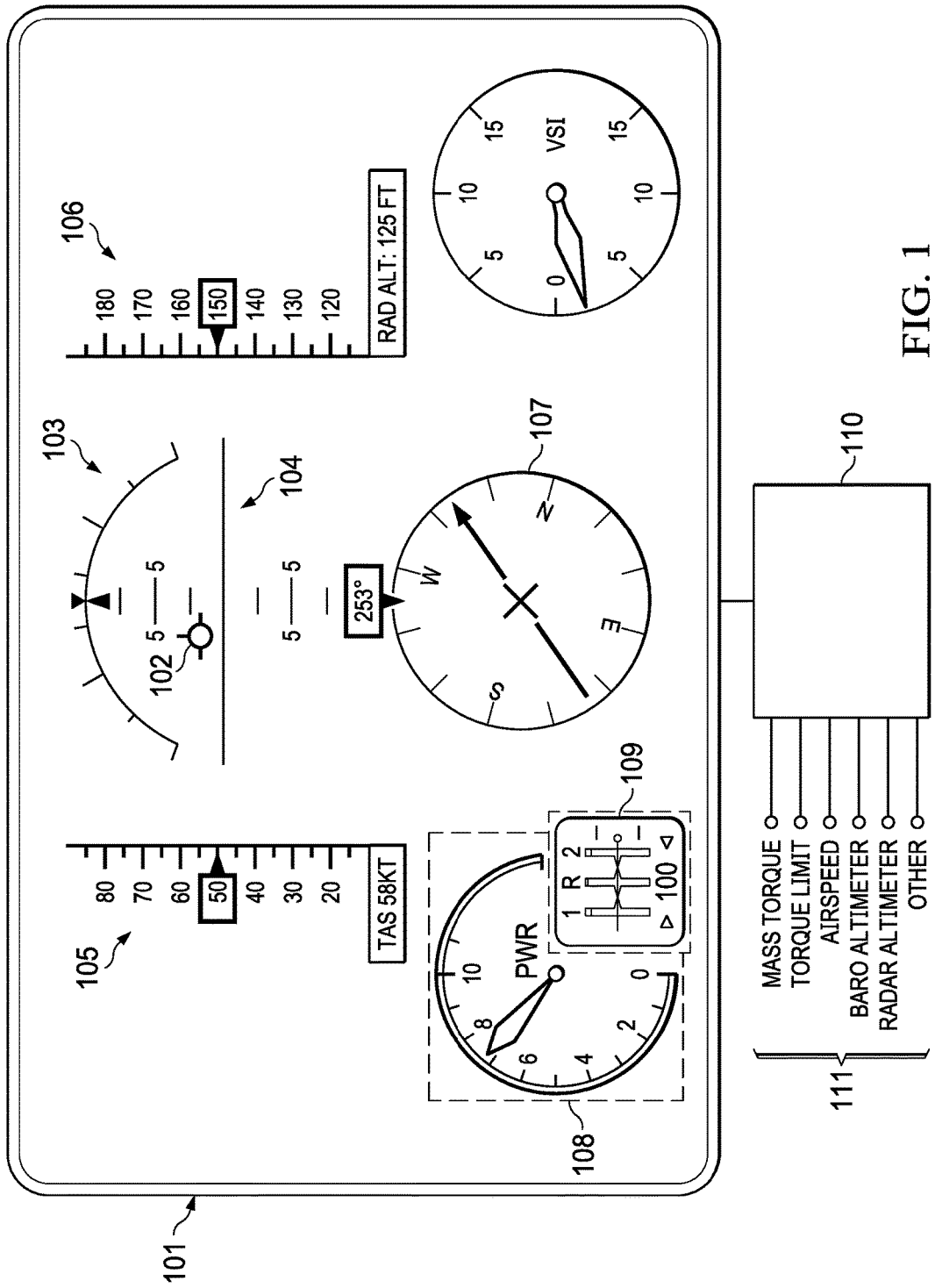

Having thus described the invention in general terms, reference will now be made to the accompanying drawings, which are not necessarily drawn to scale, and wherein:

FIG. 1 illustrates flight instruments that may be displayed to a rotorcraft pilot on a display unit.

Figure 2:
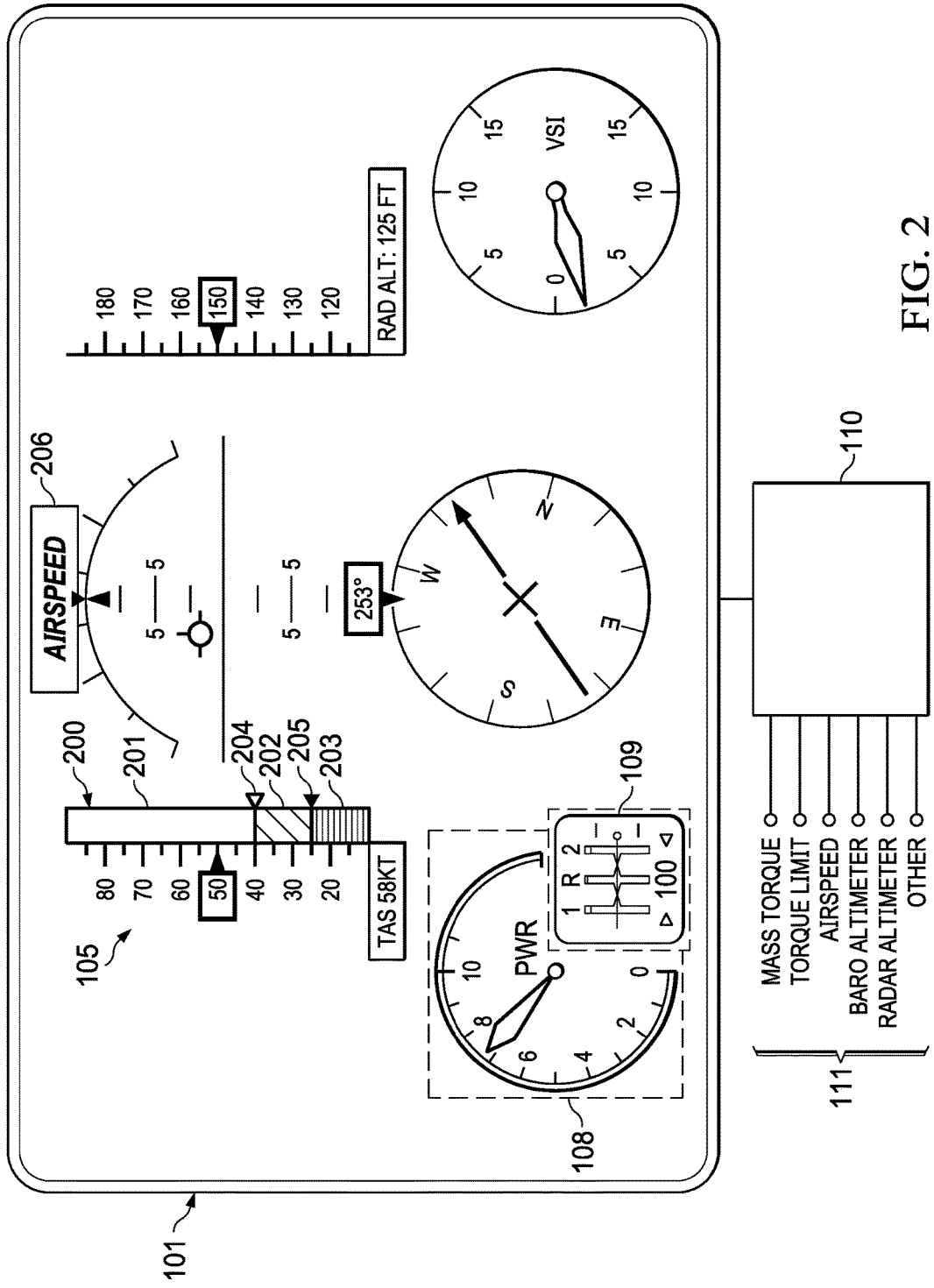

FIG. 2 illustrates airspeed warnings on a display unit according to an embodiment.

Figure 3:
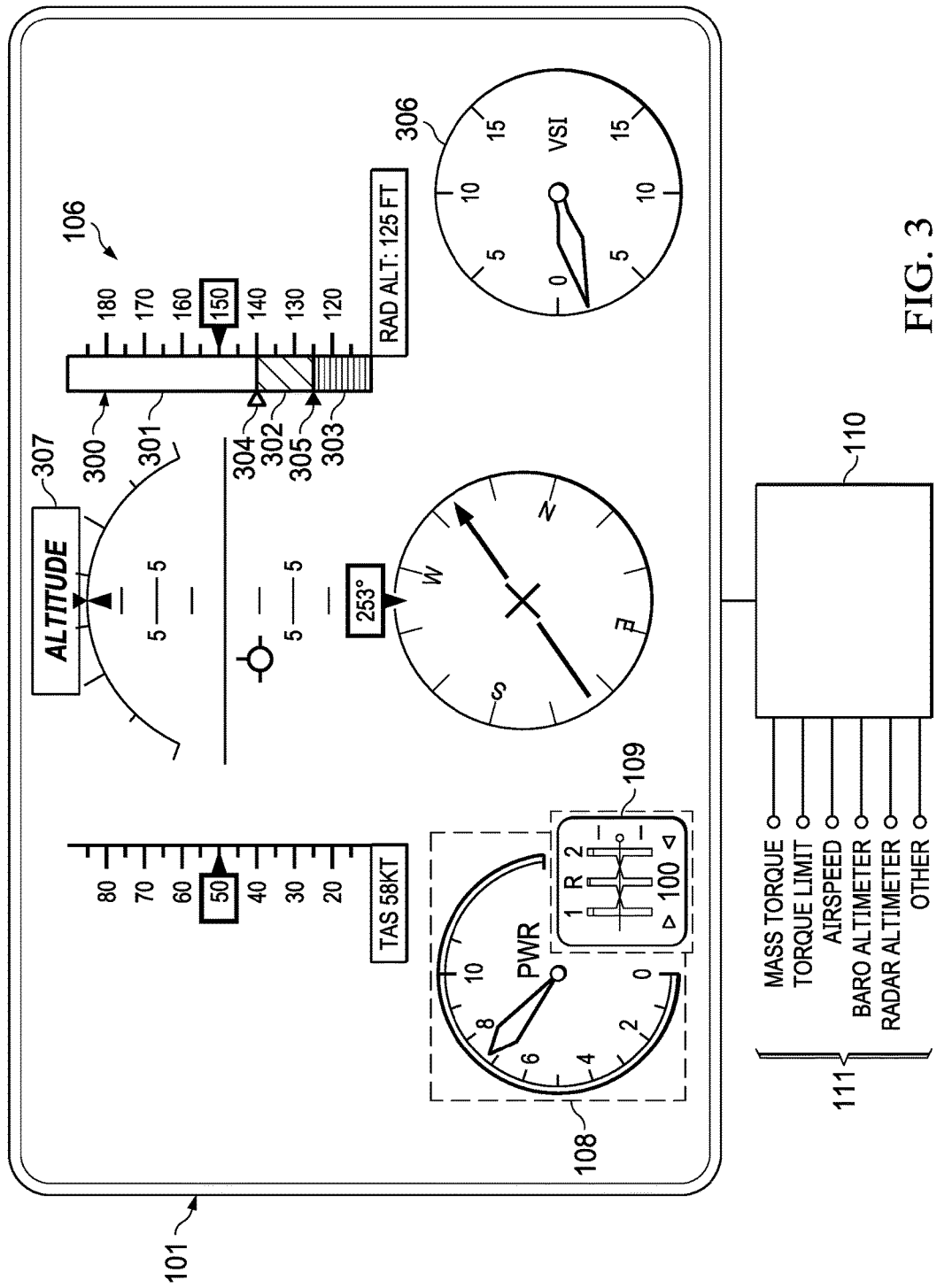

FIG. 3 illustrates altitude warnings on a display unit according to an embodiment.

Figure 4:
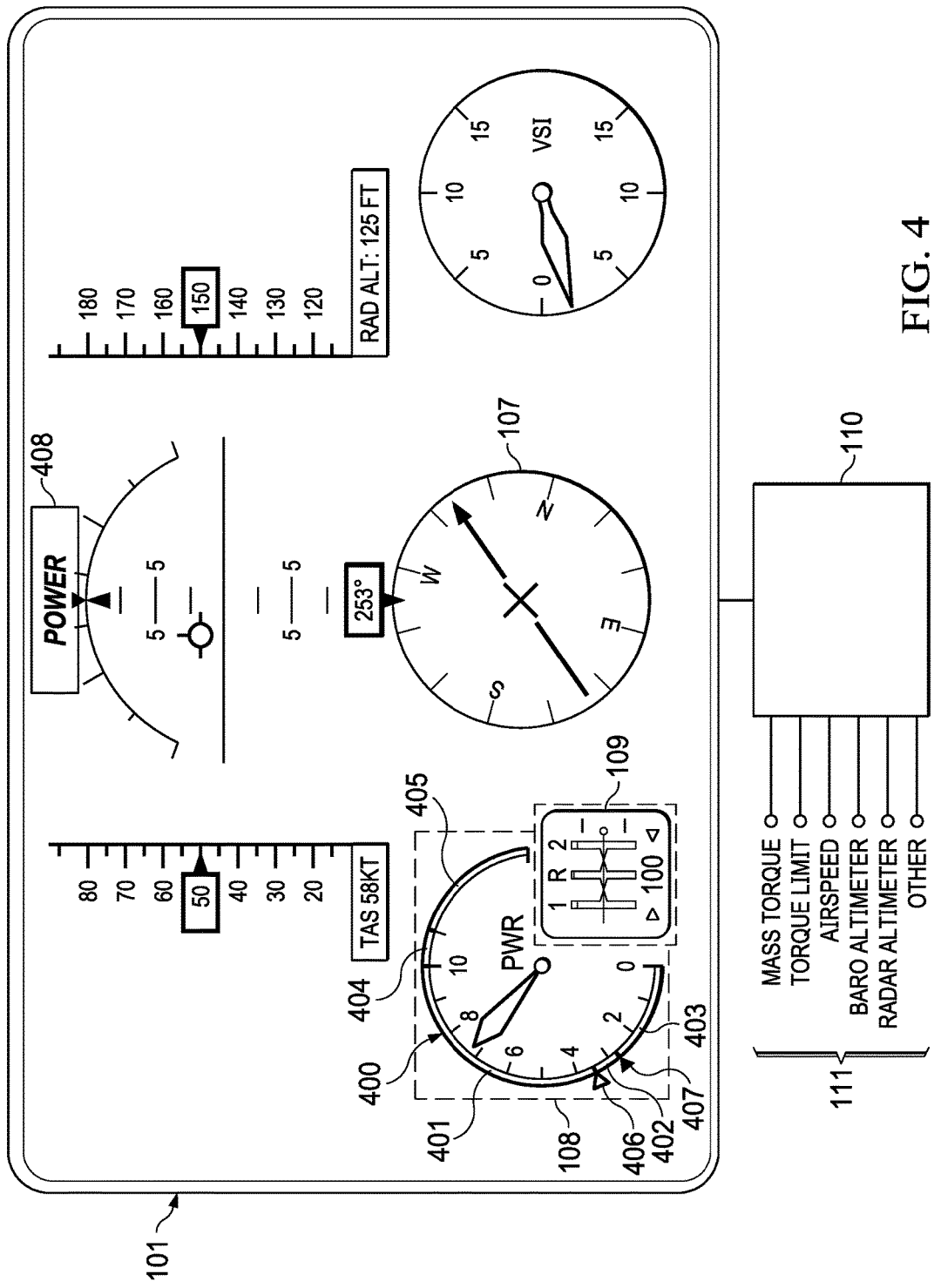

FIG. 4 illustrates power warnings on a display unit according to another embodiment.

Figure 5:
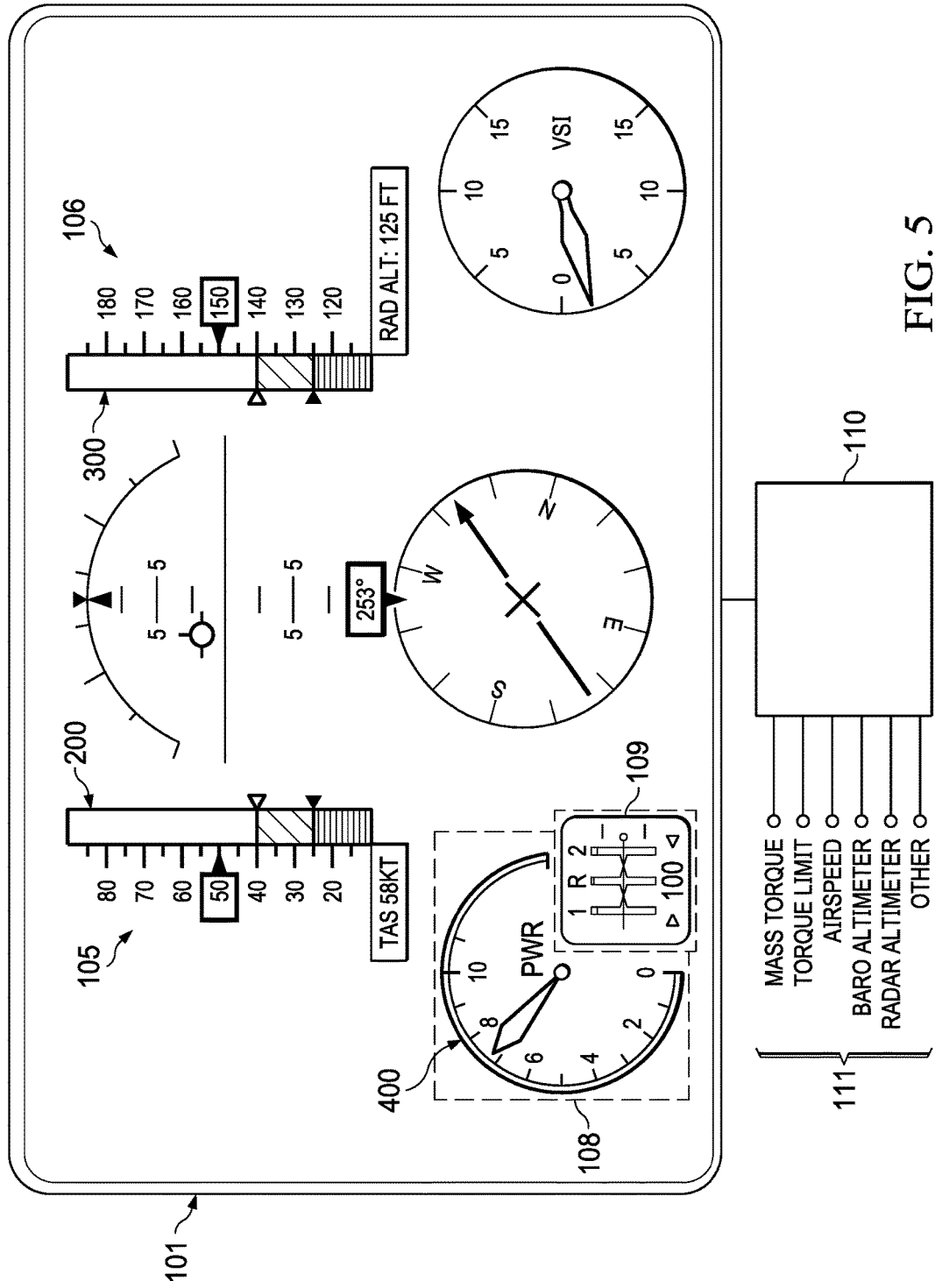

FIG. 5 illustrates a display unit displaying a plurality of warnings.

Figure 6:
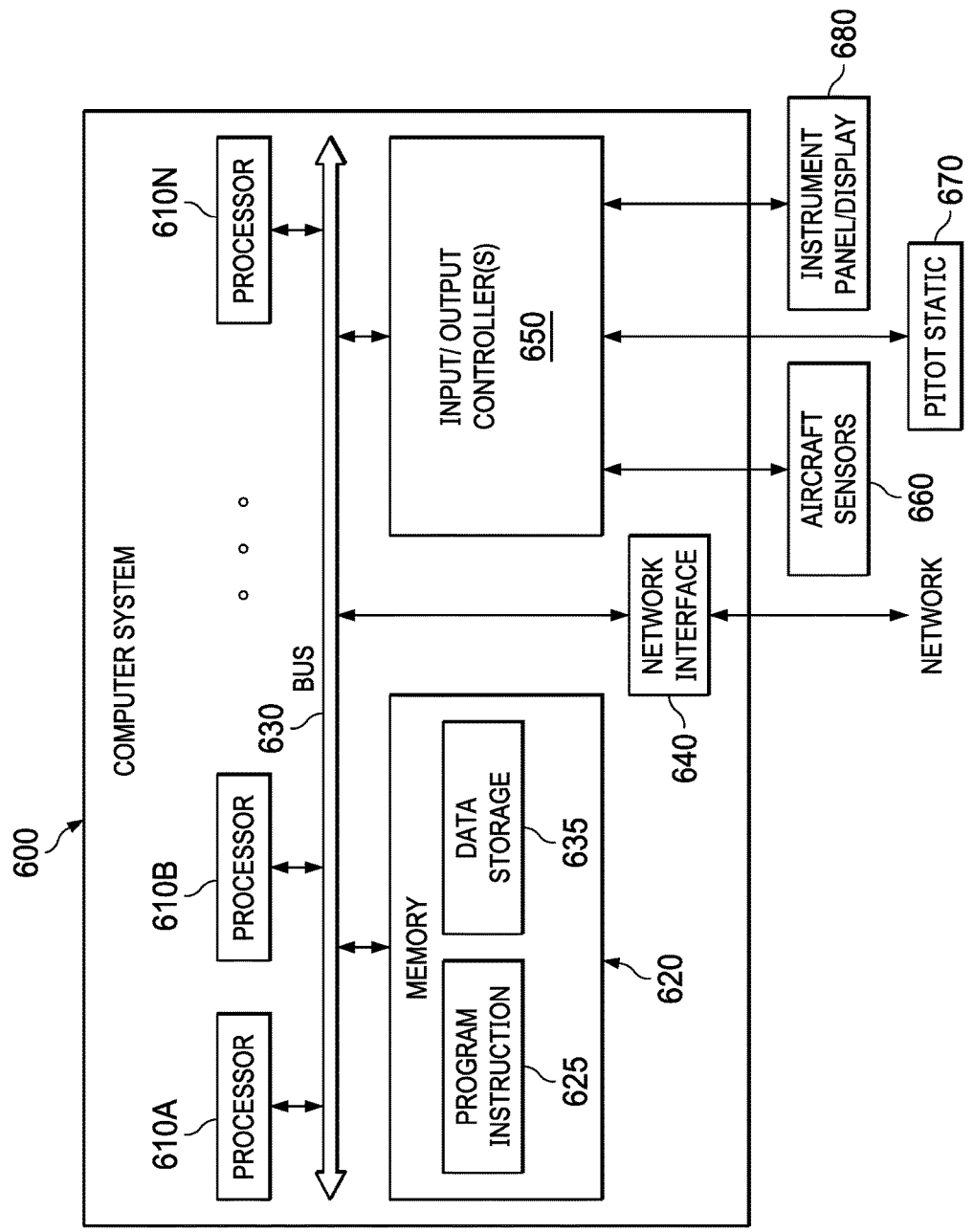

FIG. 6 is an example schematic of a computer system in accordance with some embodiments.

While the system of the present application is susceptible to various modifications and alternative forms, specific embodiments thereof have been shown by way of example in the drawings and are herein described in detail. It should be understood, however, that the description herein of specific embodiments is not intended to limit the system to the particular forms disclosed, but on the contrary, the intention is to cover all modifications, equivalents, and alternatives falling within the spirit and scope of the present application as defined by the appended claims.

DETAILED DESCRIPTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the following embodiments of the invention, a warning display that is based on airspeed, torque margin, height above ground, and/or other parameters will be described in conjunction with a rotorcraft (e.g., helicopter). In an example embodiment, the rotorcraft has at least one turbine engine for driving at least one rotor. However, it will be appreciated that the warning could be used in other types of aircraft or rotorcraft.

The warning display in embodiments of the present invention is configured to provide warning indications as a function of rotorcraft flight conditions. In embodiments of the present invention, the warning display is constructed and arranged to supplement conventional rotorcraft instruments that are used to provide, for example, (a) airspeed, (b) altitude, and (c) power situation. An example power situation indicator is disclosed in U.S. Pat. No. 7,414,544, the disclosure of which is incorporated herein by reference. The warning display provides protection against loss of airspeed or altitude on approach as a function of one or more of mast torque, torque limit, torque margin, airspeed, and/or height above surface. Mast torque is the power measured at the transmission shaft driving the main rotor. If mast torque is not directly measured (such as in a multi-engine rotorcraft), mast torque can be closely approximated by an algorithm that sums the engine torques and corrects for power provided to transmission-driven accessories. Height above surface may be measured, for example, using a radar altimeter or by applying local/GPS terrain data (e.g., elevation relative to mean sea level) to a barometric altimeter.

FIG. 1 illustrates flight instruments that may be displayed to a rotorcraft pilot on display unit 101, which may be, for example, a Primary Flight Display (PFD) or Multi-Function Display (MFD). The illustrated flight instruments include a velocity vector or flight path marker 102, roll indicator 103, pitch indicator 104, airspeed indicator 105, altitude indicator 106, compass 107, power situation area 108, and rotor situation area 109. Although the information is displayed electronically on an electronic display unit, it will be understood that physical aviation instruments, such as a gyroscope, airspeed indicator, altimeter, compass, etc., may also be used and modified to include the warnings described herein. Moreover, it will be understood that FIG. 1 is highly simplified and that any appropriate flight and rotorcraft data may also be shown on display unit 101.

A calculation unit 110 is configured to process data provided by a plurality of inputs 111. Calculation unit 110 may be a component of display unit 101 or may be a separate component, such as a processor executing a display driver application. In one implementation, inputs 111 may correspond to static or dynamic data that is provided from a plurality of sensors and/or stored values. Calculation unit 110 uses one or more of mast torque, torque limit, torque margin, airspeed, height above surface and/or other data inputs to display flight instruments 102-109 and other information. Calculation 110 can be a central processing unit or any microprocessor-based device that executes computer-readable instructions, such as program modules, to calculate and display flight instrument warnings.

Calculation unit 110 generates warnings to be displayed to the aircrew on display unit 101. Different types of warnings may be generated for different flight phases and/or conditions, such as take-off, climb-out, cruise, approach, landing, autorotation, inoperative engine(s), etc. In one embodiment, calculation unit 110 generates warnings associated with an approach-to-landing-overwater flight condition, such as flight operations associated with offshore oil and gas operations. The characteristics of this flight condition include operations at low speed and low altitude, which often occur in reduced-visibility meteorological conditions or at night. Recovery from excessive low speed and/or low altitude conditions requires applying additional engine power to the rotor. The amount of available power depends upon the engine's (or engines') current operating state, which can be anywhere from idle to full power. The application of additional engine power may be delayed due to engine spool-up time. Based upon current flight conditions (e.g., airspeed and/or altitude above surface) and propulsion system operating parameters (mast torque, torque limit, torque margin, and/or engine RPM), calculation unit 110 generates warnings on display unit 101. The alert threshold calculations in calculation unit 110 can use hysteresis to avoid rapid toggling of warnings when operating near a warning threshold.

FIG. 2 illustrates airspeed warnings on display unit 101 according to another embodiment. A low airspeed warning band 200 is presented on airspeed indicator 105. Low airspeed warning band 200 can comprise a plurality of segments 201-203, which may be color coded to indicate different airspeed warning zones. The airspeed warning zones may be based, for example, on torque margin available and rotorcraft height above surface (e.g., radar altimeter measured height). In one embodiment, for the rotorcraft's current torque margin and height above surface, an airspeed warning segment 201 may be colored green and may correspond to safe operating airspeeds, a warning segment 202 may be colored yellow and may correspond to airspeeds that are approaching an unsafe value, and a warning segment 203 may be colored red and may correspond to unsafe operating airspeeds for the rotorcraft's current operating state.

In addition to, or instead of, low airspeed warning band 200, one or more caret indicators or markers 204, 205 can be displayed to warn the aircrew when the rotorcraft's airspeed is approaching, is at, or is below an unsafe airspeed for the current torque margin and height above surface.

Additional warnings, such as a flashing text box 206, may be presented on display unit 101 to ensure that the aircrew recognizes when an unsafe airspeed condition occurs, such as when current rotorcraft airspeed falls within segment 203. Audio alerts, such as "AIRSPEED! AIRSPEED!" or "POWER! POWER!" may be broadcast to the aircrew when the current rotorcraft airspeed falls within segment 203.

FIG. 3 illustrates altitude warnings on display unit 101 according to another embodiment. A low altitude warning band 300 is presented on altitude indicator 106. Low altitude warning band 300 may comprise a plurality of segments 301-303, which may be color coded to indicate different altitude warning zones. The altitude warning zones may be based, for example, on torque margin available and rotorcraft airspeed. In one embodiment, for the rotorcraft's current torque margin and airspeed, an altitude warning segment 301 may be colored green and may correspond to safe operating altitudes, a warning segment 302 may be colored yellow and may correspond to altitudes that are approaching an unsafe value, and a warning segment 303 may be colored red and may correspond to unsafe operating altitudes for the rotorcraft's current state.

In addition to, or instead of, low airspeed warning band 300, one or more caret indicators or markers 304, 305 can be displayed to warn the aircrew when the rotorcraft's altitude is approaching, is at, or is below an unsafe altitude for the current torque margin and airspeed.

In another embodiment, FIG. 3 illustrates warnings for an excessive rate of descent. Display unit 101 may further include a vertical speed indicator (VSI) 306 or vertical velocity indicator (VVI) as additional flight instruments. Vertical speed indicator 306 indicates a rate of climb or descent in feet per minute, for example. The warning band 300 may function as a rate-of-descent warning band on altitude indicator 106 to indicate when a current rate of descent exceeds predefined thresholds. For example, warning thresholds may be calculated for rate of descent values that are equal to or double the current altitude. Rate of descent warning band 300 can comprise a plurality of segments 301-303 that are color coded to indicate different rate of descent warning zones. The rate of descent warning zones may be based, for example, on current vertical speed for the rotorcraft. Additional factors, such as available torque margin and rotorcraft airspeed, may be considered when calculating the warning zones 301-303. In one embodiment, for the rotorcraft's current vertical speed, an altitude warning segment 301 may be colored green and may correspond to safe operating rate of descent and altitude. A warning segment 302 may be colored yellow and may correspond to altitudes that are equal to or below the current vertical speed (e.g., rotorcraft below 500 feet AGL while at a rate of descent of 500 feet per minute). A warning segment 303 may be colored red and may correspond to altitudes that are equal to or below twice the current vertical speed (e.g., rotorcraft below 500 feet AGL while at a rate of descent of 1000 feet per minute).

In addition to, or instead of, rate of descent warning band 300, one or more caret indicators or markers 304, 305 can be displayed to warn the aircrew when the rotorcraft's rate of descent may be unsafe.

Additional warnings, such as a flashing text box 307, may be presented on display unit 101 to ensure that the aircrew recognizes when an unsafe altitude condition occurs, such as when current rotorcraft altitude falls within segment 303. Audio alerts, such as "ALTITUDE! ALTITUDE!", "CLIMB! CLIMB!", or "POWER! POWER!" may be broadcast to the aircrew when the current rotorcraft altitude or rate of descent falls within segment 303.

FIG. 4 illustrates power warnings on display unit 101 according to another embodiment. A power warning band 400 is presented in power situation area 108. A low-power warning band 400 can comprise a plurality of segments 401-405, which may be color coded to indicate different power warning zones. The power warning zones may be based, for example, on rotorcraft airspeed and height above surface. In one embodiment, for the rotorcraft's current airspeed and height above surface, a power warning segment 301 may be colored green and may correspond to safe operating power, which can include sufficient mast torque, torque limit, torque margin, and/or engine RPM for current rotorcraft flight conditions. A warning segment 302 may be colored yellow and may correspond to power levels that are approaching an unsafe (i.e., insufficient) value, and a warning segment 303 may be colored red and may correspond to insufficient available power levels for the rotorcraft's current state. Additional warning segments 404, 405 may be included to represent engine operations that are approaching or within unsafe excessive-power conditions under current or normal flight conditions.

In addition to, or instead of, low power warning band 400, one or more caret indicators or markers 406, 407 can be displayed to warn the aircrew when the rotorcraft's available power is approaching, is at, or is below an unsafe power level for the current airspeed and height above surface.

Additionally, warning zones, caret markers, and/or other indicators may be displayed in rotor situation area 109 based on the rotorcraft's current airspeed and height above surface.

Additional warnings, such as a flashing text box 408, may be presented on display unit 101 to ensure that the aircrew recognizes when an unsafe power situation or rotor situation occurs, such as when current rotorcraft power situation falls within segment 403. Audio alerts, such as "POWER! POWER!" or "ROTOR! ROTOR!" may be broadcast to the aircrew when the current rotorcraft power situation falls within segment 403 or if a rotor speed reaches an unsafe threshold.

FIG. 5 illustrates a display unit 101 displaying a plurality of the warnings described in FIGS. 2-4. Any combination of the airspeed, altitude, rate of descent, and power warnings may be presented simultaneously or selectively on display unit 101. For example, an aircrew may select which warnings are required or desired for a particular flight, phase of flight, or operational environment. Alternatively, calculation unit 110 or some other component may automatically select which combination of warnings and indications should be used for the particular flight, phase of flight, or operational environment.

In other embodiments, the warnings are presented on the display only when an aircraft is approaching or in unsafe flight conditions. When the aircraft is in safe flight conditions, such as the green zones described above, the airspeed, altitude, and or power warning bands may be removed to unclutter the display.

Some embodiments of systems and methods for providing flight instrument warning displays, as described herein, may be implemented or executed, at least in part, by one or more computer systems. One such computer system is illustrated in FIG. 6. In various embodiments, computer system 600 may be a display driver or graphics processing unit.

As illustrated, computer system 600 includes one or more processors 610A-N coupled to a system memory 620 via bus 630. Computer system 600 further includes a network interface 640 coupled to bus 630, and one or more input/output (I/O) controllers 650, which in turn are coupled to peripheral devices such as aircraft sensors 660, pitot static sensors 670, instrument panel or display 680 (e.g., display unit 101), etc. Each of I/O devices 660, 670, 680 may be capable of communicating with I/O controllers 650, for example, via a wired connection (e.g., serial port, Universal Serial Bus port) or wireless connection (e.g., Wi-Fi, Bluetooth, Near Field Communications, etc.). Other devices may include, for example, keyboards, keypads, an attitude-heading reference system (AHRS), an air data computer (ADC), navigation systems, communication systems, gyroscopic flight instruments, etc.

In various embodiments, computer system 600 may be a single-processor system including one processor 610A, or a multi-processor system including two or more processors 610A-N (e.g., two, four, eight, or another suitable number). Processors 610 may be any processor capable of executing program instructions. For example, in various embodiments, processors 610 may be general-purpose or embedded processors implementing any of a variety of instruction set architectures (ISAs), such as the x86, PowerPC®, ARM®, SPARC®, or MIPS® ISAs, or any other suitable ISA. In multi-processor systems, each of processors 610 may commonly, but not necessarily, implement the same ISA. Also, in some embodiments, at least one processor 610 may be a graphics processing unit (GPU) or another dedicated graphics-rendering device.

System memory 620 may be configured to store program instructions and/or data accessible by processor 610. In various embodiments, system memory 620 may be implemented using any suitable memory technology, such as static random-access memory (SRAM), synchronous dynamic RAM (SDRAM), nonvolatile/Flash-type memory, or any other type of memory. As illustrated, program instructions and data implementing certain operations and modules such as those described herein may be stored within system memory 620 as program instructions 625 and data storage 635, respectively. In other embodiments, program instructions and/or data may be received, sent, or stored upon different types of computer-accessible media or on similar media separate from system memory 620 or computer system 600.

A computer-accessible medium may include any tangible and/or non-transitory storage media or memory media such as electronic, magnetic, or optical media coupled to computer system 600 via bus 630. The terms "tangible" and "non-transitory," as used herein, are intended to describe a computer-readable storage medium (or "memory") excluding propagating electromagnetic signals but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In an embodiment, bus 630 may be configured to coordinate I/O traffic between processor 610, system memory 620, and any peripheral devices in the computer system, including network interface 640 or other peripheral interfaces, such as I/O devices 660, 670, 680. In some embodiments, bus 630 may perform any necessary protocol, timing, or other data transformations to convert data signals from one component (e.g., system memory 620) into a format suitable for use by another component (e.g., processor 610). In some embodiments, bus 630 may include support for devices attached through various types of peripheral buses, such as a variant of the Peripheral Component Interconnect (PCI) bus standard or the Universal Serial Bus (USB) standard, for example. In some embodiments, the function of bus 630 may be split into two or more separate components, such as a northbridge chipset and a southbridge chipset, for example. In addition, in some embodiments some or all the functionality of bus 630, such as an interface to system memory 620, may be incorporated directly into processor(s) 610A-N.

Network interface 640 may be configured to allow data to be exchanged between computer system 600 and other devices attached to a network, such as other computer systems, or between nodes of computer system 600. In various embodiments, network interface 640 may support communication via wired or wireless general data networks, or via any other suitable type of network and/or protocol I/O controllers 650 may, in some embodiments, enable communications with one or more display terminals, keyboards, keypads, touchpads, scanning devices, voice or optical recognition devices, mobile devices, or any other devices suitable for entering or retrieving data by one or more computer system 600. Multiple I/O controllers 650 may be present in computer system 600 or may be distributed on various nodes of computer system 600. In some embodiments, I/O devices may be separate from computer system 600 and may interact with one or more nodes of computer system 600 through a wired or wireless connection, such as over network interface 640.

As shown in FIG. 6, system memory 620 may include program instructions 625, configured to implement certain embodiments described herein, and data storage 635, comprising various data may be accessible by program instructions 625. In an embodiment, program instructions 625 may include software elements, which may be configured to affect the operations discussed in FIGS. 1-5. Program instructions 625 may be implemented in various embodiments using any desired programming language, scripting language, or combination of programming languages and/or scripting languages (e.g., C, C++, C#, Java™, JavaScript™, Perl, etc.). Data storage 635 may include data that may be used in these embodiments (e.g., profiles for different modes of operations, rotorcraft and engine characteristics, etc.). In other embodiments, other or different software elements and data may be included.

A person of ordinary skill in the art will appreciate that computer system 600 is merely illustrative and is not intended to limit the scope of the disclosure described herein. The computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations including virtual configurations.

It should be understood that the various operations described herein, particularly in connection with FIGS. 1-5, may be implemented in software executed by processing circuitry, hardware, or a combination thereof. The order in which each operation of a given method is performed may be changed, and various operations may be added, reordered, combined, omitted, modified, etc. It is intended that embodiment(s) described herein embrace all such modifications and changes and, accordingly, the above description should be regarded in an illustrative rather than a restrictive sense.

An example method implemented by software may comprise, for example, receiving inputs from one or more aircraft systems, determining if warnings should be displayed based on current aircraft flight conditions and aircraft propulsion system parameters, and generating graphics for a flight instrument display, wherein the graphics comprise one or more warnings indicating a low power condition during low altitude or low airspeed flight. The aircraft propulsion system parameters may comprise one or more of mast torque, torque limit, torque margin, and engine RPM. The current aircraft flight conditions may comprise one or more of airspeed, barometric altitude, and radar altitude. The current aircraft flight conditions may also comprise one or more of flight phases selected from take-off, climb-out, cruise, approach, landing, autorotation, and failed engine conditions.

The graphics may comprise an airspeed warning band having a plurality of segments, wherein each segment is associated with a different airspeed warning zone, and wherein each zone is defined based upon a current aircraft power available and a current aircraft height above surface. The graphics may further comprise one or more indicators on an airspeed display, wherein the indicators are positioned based upon an unsafe airspeed determined for a current aircraft power available and a current aircraft height above surface.

The graphics may comprise an altitude warning band having a plurality of segments, wherein each segment is associated with a different altitude warning zone, and wherein each zone is defined based upon a current aircraft power available and a current aircraft airspeed. The graphics may further comprise one or more indicators on an altitude display, wherein the indicators are positioned based upon an unsafe altitude determined for a current aircraft power available and a current aircraft airspeed.

The graphics may comprise a power warning band having a plurality of segments, wherein each segment is associated with a different power warning zone, and wherein each zone is defined based upon a current aircraft airspeed and a current aircraft height above surface. The graphics may further comprise one or more indicators on a power display, wherein the indicators are positioned based upon an unsafe available power level determined for a current aircraft airspeed and a current aircraft height above surface.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for illustration and description only and is not intended as a definition of the limits of the present invention.

What is claimed is:

1. A aircraft display, comprising:
a calculation unit configured to receive inputs from one or more aircraft systems and to determine if warnings should be displayed based on current aircraft flight conditions and aircraft propulsion system parameters; and
a display unit configured to receive input from the calculation unit and to generate graphics for a flight instrument display, wherein the graphics comprise one or more warnings indicating a low power condition during low altitude flight or low airspeed flight,
wherein the graphics comprise one or more warning bands having a plurality of segments, each segment is associated with:
a different airspeed warning zone, and each zone is defined based upon a current aircraft power available and a current aircraft height above surface, or
a different altitude warning zone, and each zone is defined based upon a current aircraft power available and a current aircraft airspeed, or
a different power warning zone, and each zone is defined based upon a current aircraft airspeed and a current aircraft height above surface.

2. The aircraft display of claim 1, wherein the aircraft propulsion system parameters comprise one or more of mast torque, torque limit, torque margin, and engine RPM.

3. The aircraft display of claim 1, wherein current aircraft flight conditions comprise one or more of airspeed, barometric altitude, and radar altitude.

4. The aircraft display of claim 1, wherein the current aircraft flight conditions comprise one or more of flight phases selected from take-off, climb-out, cruise, approach, landing, autorotation, and failed engine conditions.

5. The aircraft display of claim 1, wherein the graphics comprise one or more indicators on an airspeed display, wherein the indicators are positioned based upon an unsafe airspeed determined for a current aircraft power available and a current aircraft height above surface.

6. The aircraft display of claim 1, wherein the graphics comprise one or more indicators on an altitude display, wherein the indicators are positioned based upon an unsafe altitude determined for a current aircraft power available and a current aircraft airspeed.

7. The aircraft display of claim 1, wherein the graphics comprise one or more indicators on a power display, wherein the indicators are positioned based upon an unsafe available power level determined for a current aircraft airspeed and a current aircraft height above surface.

8. A method, comprising:
   receiving inputs from one or more aircraft systems;
   determining if warnings should be displayed based on current aircraft flight conditions and aircraft propulsion system parameters; and
   generating graphics for a flight instrument display, wherein the graphics comprise one or more warnings indicating a low power condition during low altitude or low airspeed flight,
   wherein the graphics comprise one or more indicators on:
      an airspeed display, wherein the indicators are positioned based upon an unsafe airspeed determined for a current aircraft power available and a current aircraft height above surface; or
      an altitude display, wherein the indicators are positioned based upon an unsafe altitude determined for a current aircraft power available and a current aircraft airspeed; or
      a power display, wherein the indicators are positioned based upon an unsafe available power level determined for a current aircraft airspeed and a current aircraft height above surface.

9. The method of claim 8, wherein the aircraft propulsion system parameters comprise one or more of mast torque, torque limit, torque margin, and engine RPM.

10. The method of claim 8, wherein current aircraft flight conditions comprise one or more of airspeed, barometric altitude, and radar altitude.

11. The method of claim 8, wherein the current aircraft flight conditions comprise one or more of flight phases selected from take-off, climb-out, cruise, approach, landing, autorotation, and failed engine conditions.

12. The method of claim 8, wherein the graphics comprise an airspeed warning band having a plurality of segments, wherein each segment is associated with a different airspeed warning zone, and wherein each zone is defined based upon a current aircraft power available and a current aircraft height above surface.

13. The method of claim 8, wherein the graphics comprise an altitude warning band having a plurality of segments, wherein each segment is associated with a different altitude warning zone, and wherein each zone is defined based upon a current aircraft power available and a current aircraft airspeed.

14. The method of claim 8, wherein the graphics comprise a power warning band having a plurality of segments, wherein each segment is associated with a different power warning zone, and wherein each zone is defined based upon a current aircraft airspeed and a current aircraft height above surface.

15. A aircraft display, comprising:
   a calculation unit configured to receive inputs from one or more aircraft systems and to determine if warnings should be displayed based on current aircraft flight conditions and aircraft propulsion system parameters; and
   a display unit configured to receive input from the calculation unit and to generate graphics for a flight instrument display, wherein the graphics comprise one or more warnings indicating a low power condition during low altitude flight or low airspeed flight,
   wherein the graphics comprise one or more indicators on an airspeed display, wherein the indicators are positioned based upon an unsafe airspeed determined for a current torque margin available and a current aircraft height above surface.

* * * * *